A. A. Nuquist,
Harrow.

No. 93,115.    Patented July 27, 1869.

Witnesses:    Inventor:

United States Patent Office.

ANDREW A. NUQUIST, OF ONEIDA, ILLINOIS.

*Letters Patent No. 93,115, dated July 27, 1869.*

IMPROVEMENT IN HARROWS.

The Schedule referred to in these Letters Patent and making part of the same.

*To all whom it may concern:*

Be it known that I, ANDREW A. NUQUIST, of Oneida, in the county of Knox, and in the State of Illinois, have invented certain new and useful Improvements in Harrows; and do hereby declare that the following is a full, clear, and exact description thereof, reference being had to the accompanying drawings, and to the letters of reference marked thereon.

The nature of my invention consists in the construction and arrangement of a "harrow," which will be hereinafter fully set forth.

In order to enable others skilled in the art to which my invention appertains, to make and use the same, I will now proceed to describe its construction and operation, referring to the annexed drawings, which form a part of this specification, and in which—

Figure 1:
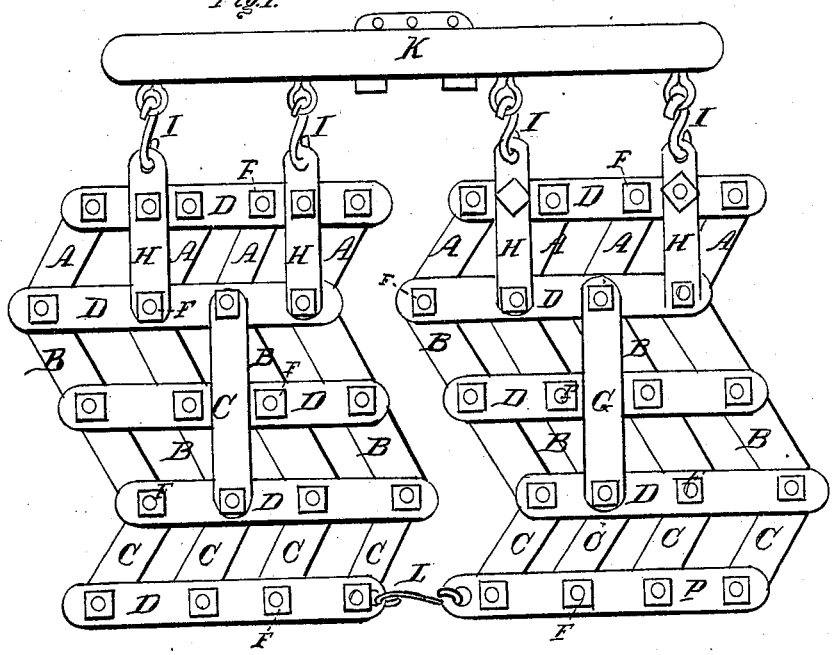
Figure 2:
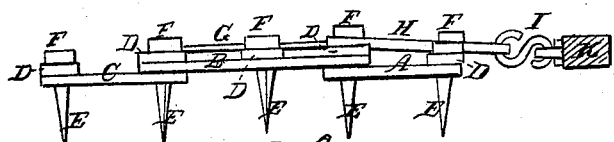
Figure 3:
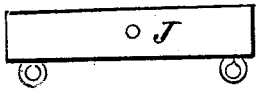

Figure 1 is a plain view, and
Figure 2 a side view.
Figure 3 is a plan of the evener, used when the harrow is divided and drawn by one horse only.

My harrow consists of two single harrows, each made of several series of bars, A A, B B, and C C, placed in zigzag form, end to end, with cross-bars D D placed on top, and the whole connected and held together by means of the harrow-teeth E E, which are, on their upper ends, provided with screw-threads.

The screw-ends of the teeth A A pass through the bars and cross-bars, and nuts, F F, are placed on the same, thus holding all the parts of the single harrow together.

The cross-bars D, next to the last, at each end are connected by a metal bar, G, as shown in fig. 1, and across the two cross-bars, at the front of the harrow, are two other metal bars, H H, all of which metal bars are secured by being put on the screw-ends of some of the teeth before their nuts are screwed on.

The metal bars H H extend a suitable distance in front of the harrow, and are, by means of hooks I I, connected with a bar, K, to which the team is hitched in any suitable manner.

The inner ends of the rear cross-bars D, of the two single harrows, are connected by means of a hook, L. When it is desired to use one of the harrows alone, they can easily be unhooked from each other, and from the bar K, and one of them hooked to a smaller evener, J, suitable for one horse.

The advantages that I consider this harrow to possess over all others now in use are, mainly, that the teeth or tines are so far apart as to clear themselves in corn-stalks, sodded ground, or in any other place where other harrows are liable to clog; that the joint or link between the two harrows will allow it to cover seed in all places where a dead furrow or uneven ground may be found; that the harrows take a full stroke and complete the work as they go; that they can be easily taken apart, and one horse can do the work in orchards and other places where a full harrow cannot be used; that the bars, of which the harrow is constructed, can be made of boards, which is a great object in some places, where scantlings or beams are hard to be found; that the teeth are secured by nuts, so as not to be liable to get lost, and, at the same time, serve as bolts to hold the wood-work together.

I am aware that a zigzag harrow is not new; also, that two or more zigzag harrows operated from one draught-bar are known,

What I claim, is—

A double zigzag harrow formed of a series of separate bars A B C D, flat-braces G H, and teeth E, secured by nuts F through the zigzag and cross-bars, all constructed and arranged substantially as set forth.

In testimony that I claim the foregoing, I have hereunto set my hand, this 25th day of November, 1868.

A. A. NUQUIST.

Witnesses:
W. A. BARNS,
T. HANNON.